US012520397B2

(12) United States Patent
Zhao

(10) Patent No.: US 12,520,397 B2
(45) Date of Patent: Jan. 6, 2026

(54) SYNCHRONOUS STARTING CIRCUIT AND CONSTANT CURRENT DEPTH DIMMING POWER SUPPLY

(71) Applicants: Self Electronics Co., Ltd., Zhejiang (CN); Wanjiong Lin, Zhejiang (CN); Self Electronics USA Corporation, Norcross, GA (US)

(72) Inventor: Pengyuan Zhao, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 142 days.

(21) Appl. No.: 18/464,560

(22) Filed: Sep. 11, 2023

(65) Prior Publication Data

US 2024/0090097 A1 Mar. 14, 2024

(30) Foreign Application Priority Data

Sep. 9, 2022 (CN) .......................... 202211102323.2

(51) Int. Cl.
*H05B 45/30* (2020.01)
*H05B 45/10* (2020.01)
*H05B 45/345* (2020.01)

(52) U.S. Cl.
CPC ........... *H05B 45/345* (2020.01); *H05B 45/10* (2020.01)

(58) Field of Classification Search
CPC ........ H05B 45/10; H05B 45/20; H05B 45/30; H05B 45/31; H05B 45/32; H05B 45/325; H05B 45/327; H05B 45/34; H05B 45/345
See application file for complete search history.

(56) References Cited

U.S. PATENT DOCUMENTS 11,083,062 B2 * 8/2021 Murray ................. H05B 45/24
11,800,617 B2 * 10/2023 Kumar ................ H05B 45/325

* cited by examiner

*Primary Examiner* — Long Nguyen
(74) *Attorney, Agent, or Firm* — Wang Law Firm, Inc.

(57) ABSTRACT

A synchronous start-up circuit with a constant current deep dimmable power supply; when the output voltage of the current source does not reach the start voltage of an LED luminaire, the circuit is disconnected; when the output voltage reaches the start voltage of the LED luminaire, an enabling switch circuit turns on and outputs a power-off signal, which is used for controlling the current source to wait for the output voltage of other constant current sources to reach the start voltage of the corresponding LED luminaire. When the output voltage of the constant current source reaches the starting voltage of the corresponding LED luminaire, each starting switch circuit receives a synchronized starting signal, each starting switch circuit is turned on, and each current source discharges to supply power for the LED luminaire.

12 Claims, 5 Drawing Sheets

SYNCHRONOUS STARTING CIRCUIT AND CONSTANT CURRENT DEPTH DIMMING POWER SUPPLY

TECHNICAL FIELD

The present invention relates to the technical field of LED power supply, and specifically relates to a synchronous start-up circuit and a constant current deep dimmable power supply.

BACKGROUND TECHNOLOGY

Currently, the LED power supply market is divided into two categories: constant voltage power supply and constant current power supply. In the field of constant current circuits, in order to improve the output stability, it is necessary to increase the capacitance of electrolytic capacitors in the output circuit to reduce current ripple. For a multi-channel LED power supply, each LED power supply has a different dimming depth, in which, for a higher dimming depth of the power supply, that is, with a lower brightness (smaller current) start, knowing that C=Q/U and Q=I*T, for a capacitor with fixed capacitance, the voltage across its terminals is proportional to the charging current, so the required charging time is longer. Conversely, for a power supply with a lower dimming depth, the required charging time is shorter. Based on this, it is difficult to synchronize the startup of each LED power supply, resulting in unpleasant user experience.

SUMMARY OF THE INVENTION

Therefore, the technical problem to be solved by the present invention is to solve the problem of response delay due to the charging process when a single or multiple LED lamps in the prior art are started with a small current, so as to provide a synchronous start-up circuit and a constant-current deep dimmable power supply.

In order to achieve the above purpose, the present invention provides the following technical solution:

In a first aspect, an embodiment of the present invention provides a synchronous start circuit, a front stage of the synchronous start circuit is connected to a constant current source for a LED luminaire, and a rear stage of the synchronous start circuit connects to a LED luminaire. The synchronous start circuit comprises: an enabling switch circuit and a starting switch circuit, wherein a first terminal of the constant current source is connected to a first terminal of the LED luminaire; a control terminal of the enabling switch circuit is connected to a second terminal of the constant current source, and a first terminal of the enabling switch circuit is connected to a second terminal of the LED luminaire, and a second terminal of the enabling switch circuit is connected to the control terminal of the constant current source; wherein a control terminal the of the starting switch circuit receives a synchronized start signal, a first terminal of the starting switch circuit is connected to an external supply voltage, a second terminal of the starting switch circuit is connected to the second terminal of the constant current source, and a third terminal of the starting switch circuit is connected to the second terminal of the LED luminaire; the synchronized start signal is used to control the synchronous start-up circuit of each LED luminaire through controlling the starting switch circuit of the synchronous start circuit of each LED luminaire for the constant current source to discharge simultaneously; when the output voltage of the constant current source does not reach the starting voltage of the LED luminaire, the enabling switch circuit and the starting switch circuit are both disconnected; when the output voltage of the constant current source reaches the starting voltage of the LED luminaire, the enabling switch circuit conducts and outputs a power-off signal, wherein the power-off signal is used to control the constant current source to no longer output current; taking the moment when the constant current source starts to output a voltage as a starting point, after a preset time, the starting switch circuit receives a synchronized start signal, the starting switch circuit then starts conducting, and the constant current source discharges to supply power to the LED luminaire.

In an embodiment, the enabling switch circuit comprises: a first enabling switch circuit and a second enabling switch circuit, wherein: a control terminal of the first enabling switch circuit is connected to the second terminal of the constant current source, the first terminal of the first enabling switch circuit is connected to the second terminal of the LED luminaire, and the second terminal of the first enabling switching circuit is connected to a control terminal of the second enabling switch circuit; a first terminal of the second enabling switch circuit is connected to the control terminal of the constant current source, and the second terminal of the second enabling switch circuit is grounded; when the output voltage of the constant current source does not reach the starting voltage of the LED luminaire, both the first enabling switch circuit and second enabling switch circuit are disconnected; when the output voltage of the constant current source reaches the starting voltage of the LED luminaire, both the first enabling switch circuit and the second enabling switch circuit conduct, and the first terminal of the second enabling switch circuit outputs a power-off signal.

In an embodiment, the first enabling switch circuit comprises: a first resistor and a first switch, wherein: a control terminal of the first switch is connected to the second terminal of the constant current source via the first resistor, a first terminal of the first switch is connected to the second terminal of the LED luminaire, and a second terminal of the first switch is connected to the control terminal of the second enabling switch circuit.

In an embodiment, the second enabling switch circuit comprises: a second resistor and a second switch, wherein: a control terminal of the second switch is connected to the second terminal of the first enabling switching circuit through the second resistor, a first terminal of the second switch is connected to the control terminal of the constant current source and a second terminal of the second switch is grounded.

In an embodiment, the second enabling switch circuit further comprises: a third resistor; and the control terminal of the second switch is further grounded through the third resistor.

In an embodiment, the starting switch circuit includes: a first starting switch circuit and a second starting switch circuit, wherein: a control terminal of the first start switching circuit receives a synchronized start signal, a first terminal of the first start switching circuit is connected to an external supply voltage, and a second terminal of the first start switching circuit is connected to a first terminal of the second start switching circuit; a second terminal of the second start switching circuit is connected to the second terminal of the LED luminaire and a third terminal of the second start switching circuit is connected to the second terminal of the constant current source; when the output voltage of the constant current source does not reach the starting voltage of the LED luminaire, the first starting switching circuit and second starting switching circuit are disconnected; when the output voltage of the constant current source reaches the starting voltage of the LED luminaire, after a preset time, the first starting switch circuit receives a synchronized starting signal and conducts, the second starting switch circuit conducts and the constant current source discharges to supply power to the LED luminaire.

In an embodiment, the first starting switch circuit comprises: a third switch, a fourth switch, a fourth resistor, and a fifth resistor, wherein: a control terminal of the third switch receives a synchronized start signal through the fourth resistor, the first terminal of the third switch is connected to a control terminal of the fourth switch through the fifth resistor, and the second terminal of the third switch is grounded; a first terminal of the fourth switch is connected to an external supply voltage, and a second terminal of the fourth switch is connected to the first terminal of the second starting switch circuit.

In an embodiment, the second starting switch circuit comprises: a fifth switch, a sixth resistor, and a seventh resistor, wherein: a control terminal of the fifth switch is connected to the second terminal of the first start switching circuit through the sixth resistor, the control terminal of the fifth switch is also connected to the second terminal of the constant current source through the seventh resistor, the first terminal of the fifth switch is connected to the second terminal of the LED luminaire and the second terminal of the fifth switch is connected to the second terminal of the constant current source.

In an embodiment, the second starting switch circuit further comprises a first diode wherein: a cathode of the first diode is connected to a first terminal of the sixth resistor, and an anode of the first diode is connected to a second terminal of the sixth resistor.

In an embodiment, the second starting switch circuit further comprises: a filter capacitor connecting the control terminal of the fifth switch and the second terminal of the fifth switch.

In a second aspect, an embodiment of the present invention provides a constant current deep dimmable power supply, including: the synchronous start circuit of the first aspect and a constant current source, wherein: the first terminal of the constant current source is connected to the first terminal of the LED luminaire, and the second terminal of the constant current source is connected to a first terminal of the synchronous start-up circuit; a second terminal of the synchronous start-up circuit is connected to the second terminal of the LED luminaire, a third terminal of the synchronous start-up circuit is connected to the control terminal of the constant current source, a fourth terminal of the synchronous start-up circuit inputs a synchronized start signal, and a fifth terminal of the synchronous start-up circuit is connected to an external power supply voltage; when the output voltage of the constant current source does not reach the starting voltage of the LED luminaire, the synchronous start-up circuit is disconnected; when the output voltage of the constant current source reaches the starting voltage of the LED luminaire, the synchronous start-up circuit outputs a power-off signal and the constant current source no longer outputs current; taking the moment when the constant current source starts to output a voltage as a starting point, after a preset time, the synchronous start-up circuit receives a synchronized start signal and the constant current source discharges to supply power to the LED luminaire.

In an embodiment, the constant current source includes: a voltage conversion circuit and an electrolytic capacitor, wherein: a first terminal of the voltage conversion circuit is connected to a first terminal of the electrolytic capacitor and the first terminal of the LED luminaire, a second terminal of the voltage conversion circuit is connected to a second terminal of the electrolytic capacitor and the first terminal of the synchronous start-up circuit, and a control terminal of the voltage conversion circuit is connected to the third terminal of the synchronous start-up circuit; when the voltage conversion circuit receives a charging signal, the voltage conversion circuit charges the electrolytic capacitor; when the voltage of the electrolytic capacitor does not reach the starting voltage of the LED luminaire, the synchronous start-up circuit is disconnected; when the voltage of the electrolytic capacitor reaches the starting voltage of the LED luminaire, the synchronous start-up circuit outputs a power-off signal and the voltage conversion circuit no longer charges the electrolytic capacitor; taking the moment when the voltage conversion circuit receives a charging signal as a starting point time, after a preset time, the synchronous start-up circuit receives a synchronized start signal and the electrolytic capacitor discharges to supply power to the LED luminaire.

The technical solution of the present invention has the following advantages:

The invention provides a synchronous start-up circuit and constant current deep dimmable power supply. When the output voltage of the constant current source does not reach the start voltage of the LED luminaire, the enabling switch circuit and starting switch circuit are both disconnected; when the output voltage of the constant current source reaches the start voltage of the LED luminaire, the enabling switch circuit conducts and outputs the power-off signal, the power-off signal is used for controlling the constant current source to stop outputting current, in order to wait for the output voltage of other constant current sources to reach the start voltage of the corresponding LED luminaire. Taking the moment when the constant current source starts outputting voltage as the starting point, after a preset time, each starting switch circuit receives the synchronized starting signal, and each starting switch circuit turns on, and each constant current source discharges to supply power to the LED luminaire, so as to achieve the simultaneous starting of the LED luminaires as well as the timely starting of the LED luminaires.

BRIEF DESCRIPTION OF DRAWINGS

In order to more clearly illustrate the technical solution in the specific embodiments of the present invention or the technical solutions in the prior art, the accompanying drawings to be used in the description of the specific embodiments or prior art will be briefly introduced below, and it will be obvious that the accompanying drawings in the following description are some of the embodiments of the present invention, and for the person of ordinary skill in the field, other drawings can be obtained according to these drawings without being inventive. In the drawings.

DETAILED DESCRIPTION OF THE INVENTION

The technical embodiments of the present invention will be described clearly and completely in the following in connection with the accompanying drawings, and it is obvious that the described embodiments are a part of the embodiments of the present invention and not all of the embodiments. Based on the embodiments in the present invention, all other embodiments obtained by a person of ordinary skill in the art without being inventive fall within the scope of protection of the present invention.

In the description of the present invention, it is to be noted that the terms "center", "up", "down", "left" "right", "vertical", "horizontal", "inside", "outside", etc. indicate an orientation. The orientation or positional relationships indicated by "left", "right", "vertical", "horizontal", "inside", "outside", etc. are based on those shown in the accompanying drawings, and are intended only for the convenience of describing the present invention and for simplifying the description, and are not intended to indicate or imply that the device or element referred to must be constructed and operated with a particular orientation, and therefore are not to be construed as a limitation of the present invention. Furthermore, the terms "first", "second", "third" are used for descriptive purposes only and are not to be understood as indicating or implying relative importance.

In the description of the present invention, it is to be noted that, unless otherwise expressly specified and limited, the terms "mounted", "connected", "joined" are to be understood in a broad sense, e.g. as a fixed connection, a detachable connection or a connection in one piece; as a mechanical connection or an electrical connection; as a direct connection or an indirect connection through an intermediate medium; or as a connection within two elements. For example, it may be a fixed connection, a detachable connection, or a connection in one piece; it may be a mechanical connection or an electrical connection; it may be a direct connection or an indirect connection through an intermediate medium, or a connection within two elements; it may be a wireless connection or a wired connection. For those of ordinary skill in the art, the specific meaning of the above terms in the context of the present invention may be understood in specific cases.

Furthermore, the technical features involved in the different embodiments of the present invention described below may be combined with each other as long as they do not constitute a conflict with each other.

Example 1

Figure 1:
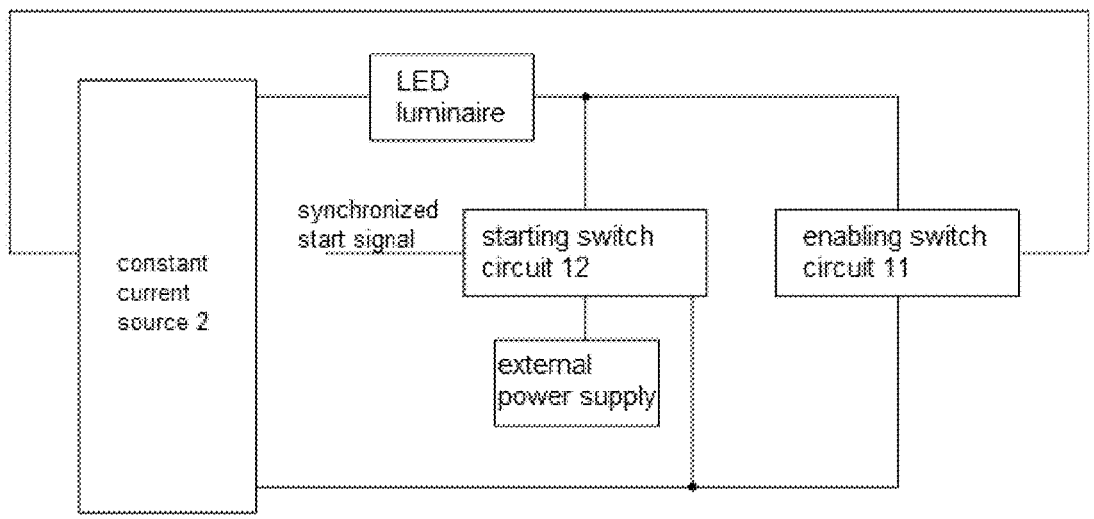
FIG. 1 shows a diagram of a specific example of a synchronous start-up circuit provided by an embodiment of the present invention.

An embodiment of the present invention provides a synchronous start-up circuit, as shown in FIG. 1, the synchronous start-up circuit is connected to a constant current source 2 of a one-way LED luminaire at a front stage, and the synchronous start-up circuit is connected to the LED luminaire at a back stage, wherein the electrolytic capacitors inside the constant current source 2 of each LED luminaire may be the same or different, and the start voltage of each LED luminaire may be the same or different, as shown in FIG. 1, and the synchronous start-up circuit comprises: Enabling switch circuit 11 and starting switch circuit 12.

As shown in FIG. 1, a constant current source 2, the first terminal of which is connected to the first terminal of the LED luminaire; the constant current source 2 may be a constant current source 2 commonly used in the field of LED technology, and is not limited herein.

As shown in FIG. 1, the control terminal of the enabling switch circuit 11 is connected to the second terminal of the constant current source 2, the first terminal of the enabling switch circuit 11 is connected to the second terminal of the LED luminaire, and the second terminal of the enabling switch circuit 11 is connected to the control terminal of the constant current source 2.

As shown in FIG. 1, the starting switch circuit 12 has a control terminal that receives the synchronized start signal, a first terminal thereof is connected to an external power supply voltage, a second terminal thereof is connected to a second terminal of the constant current source 2, and a third terminal thereof is connected to the second terminal of the LED luminaire. Herein, the synchronized start signal is sent by a peripheral controller, which may be a microcontroller, but only as an example and not as a limitation.

Specifically, the embodiment of the present invention imposes a limitation on the time for the controller to send the synchronized start signal as follows:

(1) When there is only one LED luminaire, the controller uses the moment when the constant current source starts to output current as the starting point to delay. The delay time needs to be slightly larger than the time when the constant current source voltage reaches the LED luminaire starting voltage. After that, the controller can send a synchronous start signal to the start switch circuit;

(2) When there are multiple LED luminaires, one constant current source supplies power for one luminaire and each constant current source starts to work at the same time, then the controller takes the moment when each constant current source starts to output current as the starting point for time delay, and when the voltage of each constant current source reaches the starting voltage of the corresponding LED lamps, the controller sends a synchronized starting signal to each starting switch circuit.

In order to be able to start each of the LED luminaires at the same time, it is therefore possible to send a synchronized start signal to the starting switch circuit 12 of each synchronous start-up circuit to control the constant current source 2 of each LED luminaire to discharge power for the LED luminaires at the same time by controlling each of the starting switch circuits 12 to conduct, in order to control the constant current sources 2 of each LED luminaire to discharge power for the LED luminaires at the same time.

Specifically, when the output voltage of the constant current source 2 does not reach the starting voltage of the LED luminaire, the enabling switch circuit 11 is disconnected; when the output voltage of the constant current source 2 reaches the starting voltage of the LED luminaire, the enabling switch circuit 11 conducts and outputs a power-off signal, which is used for controlling that the constant current source 2 no longer outputs current.

For example, the constant current source 2 may include a voltage conversion circuit and an electrolytic capacitor, and the discharge voltage of the electrolytic capacitor is used to supply power to the LED light luminaire, wherein the voltage conversion circuit may be a BUCK circuit. After the constant current source 2 is started, the BUCK circuit charges the electrolytic capacitor, and since the voltage of the electrolytic capacitor does not immediately reach the start voltage of the LED luminaire, the LED luminaire is disconnected, and at the same time, the voltage of the electrolytic capacitor does not immediately reach the start voltage of the enabling switching circuit 11, and thus the enabling switching circuit 11 is disconnected. When the voltage of the electrolytic capacitor reaches the starting voltage of the enabling switch circuit 11, the enabling switch circuit 11 conducts, and the enabling switch circuit 11 sends a power-off signal to the control terminal of the constant current source 2 (BUCK circuit), and at this time, the BUCK circuit no longer charges the electrolytic capacitor.

Specifically, two conditions are required for the conductivity of the starting switch circuit 12, namely: one is that the external power supply voltage reaches its start voltage, and the other is that the synchronized start signal is received. Before receiving the synchronized start signal, the starting switch circuit 12 has been connected to the external power supply voltage, and once the synchronized start signal is received, the starting switch circuit 12 immediately conducts, but in order to ensure that all of the LED luminaires are started at the same time, therefore, after all of the output voltages of the constant current sources 2 reach the LED luminaires start voltage, all of the starting switch circuits 12 receive the synchronized start signal. Therefore, when the output voltage of the constant current source 2 does not reach the starting voltage of the LED luminaire, the starting switch circuit 12 is disconnected.

Comprehensively analyzing the above, taking the constant current source 2 including the BUCK circuit and the electrolytic capacitor as an example, the synchronous startup circuit of the embodiment of the present invention operates as follows:

Step 1: The BUCK circuit starts, and the BUCK circuit charges the electrolytic capacitor, wherein the enabling switch circuit 11 and the starting switch circuit 12 are in a disconnected state while the voltage of the electrolytic capacitor does not reach the start voltage of the LED luminaire;

Step 2: When the electrolytic capacitor voltage reaches the starting voltage of the LED luminaire, the electrolytic capacitor voltage is sufficient to make the enabling switch circuit 11 conductive, but the starting switch circuit 12 is disconnected, and the enabling switch circuit 11 sends a power-off signal to the control terminal of the BUCK circuit, and the BUCK circuit stops charging the electrolytic capacitor;

Step 3: Taking the BUCK circuit start as the starting point, after a preset time, the starting switch circuit 12 receives a synchronized start signal, the starting switch circuit 12 conducts, and the electrolytic capacitor discharges to supply power to the LED luminaire.

Figure 2:
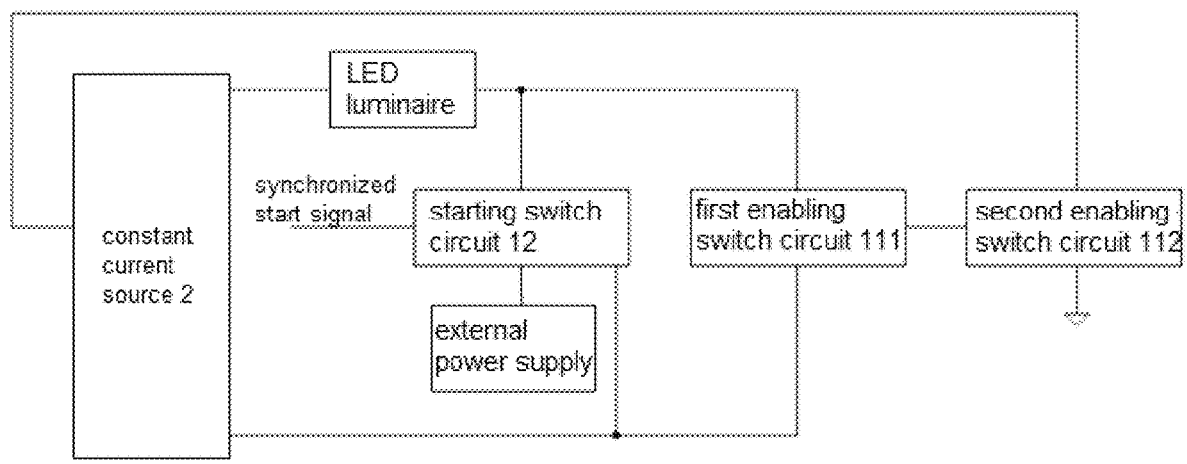
FIG. 2 shows a diagram of another specific example of a synchronous start-up circuit provided by an embodiment of the present invention.

In a specific embodiment, as shown in FIG. 2, the enabling switch circuit 11 includes: a first enabling switch circuit 111 and a second enabling switch circuit 112.

As shown in FIG. 2, the first enabling switch circuit 111 has a control terminal connected to a second terminal of the constant current source 2, a first terminal thereof is connected to a second terminal of the LED luminaire, and a second terminal thereof is connected to a control terminal of the second enabling switch circuit 112; the first enabling switch circuit 111 may be a circuit comprising a switching function element.

As shown in FIG. 2, a second enabling switching circuit 112 has a first terminal connected to an control terminal of the constant current source 2 and a second terminal that is grounded; this second enabling switching circuit 112 may be a circuit comprising a switching function element.

Specifically, when the output voltage of the constant current source 2 does not reach the starting voltage of the LED lamps, the first enabling switch circuit 111 and the second enabling switch circuit 112 are both disconnected; when the output voltage of the constant current source 2 reaches the starting voltage of the LED lamps, the first enabling switch circuit 111 and the second enabling switch circuit 112 are both conducting, and the first terminal of the second enabling switch circuit 112 outputs the power-off signal, wherein the power-off signal controls the constant current source 2 to no longer output current, i.e., the BUCK circuit no longer charges the electrolytic capacitor.

Figure 3:
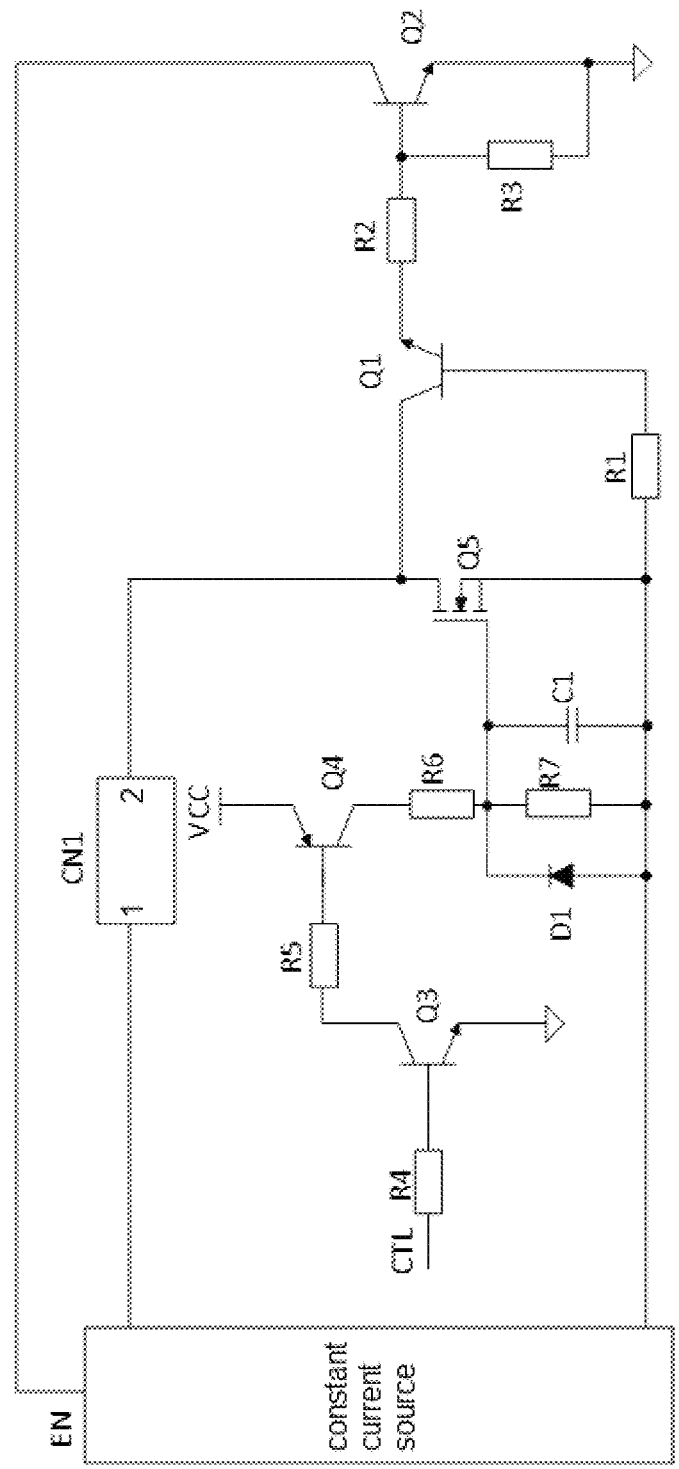
FIG. 3 shows a circuit diagram of a synchronous start-up circuit provided by an embodiment of the present invention.

In a specific embodiment, as shown in FIG. 3, the first enabling switch circuit 111 comprises: a first resistor R1 and a first switch Q1, wherein the control terminal of the first switch Q1 is connected to the second terminal of the constant current source 2 through the first resistor R1, the first terminal of the first switch Q1 is connected to the second terminal of the LED luminaire, and the second terminal of the first switch Q1 is connected to the control terminal of the second enabling switch circuit 112 (i.e., the control terminal of the fifth switch Q5). Pin 1 of the interface CN1 in FIG. 3 is connected to the first terminal of the LED luminaire, and pin 2 of the interface CN1 is connected to the second terminal of the LED luminaire.

Specifically, by setting the threshold voltage of the first switch Q1 equal to the starting voltage of the LED luminaire, when the output voltage of the constant current source 2 does not reach the starting voltage of the LED luminaire, the output voltage of the constant current source 2 necessarily also does not reach the threshold voltage of the first switch Q1, and the first switch Q1 is disconnected; when the output voltage of the constant current source 2 reaches the starting voltage of the LED luminaire, the output voltage of the constant current source 2 necessarily also reaches the threshold voltage of the first switch Q1, and the first switch Q1 conducts.

In a specific embodiment, as shown in FIG. 3, the second enabling switch circuit 112 includes: a second resistor R2 and a second switch Q2, wherein the control terminal of the second switch Q2 is connected to the second terminal of the first enabling switch circuit 111 through the second resistor R2, the first terminal of the second switch Q2 is connected to the control terminal of the constant current source 2, and the second terminal of the second switch Q2 is grounded.

Specifically, when the first switch Q1 is disconnected, the control terminal of the second switch Q2 is subjected to a low voltage, and the second switch Q2 is disconnected; when the first switch Q1 conducts, the control terminal of the second switch Q2 is subjected to a high voltage, and the second switch Q2 conducts, and the first terminal of the second switch Q2 outputs a power-off signal to the enable terminal (EN terminal) of the constant current source 2, and since the second terminal of the second switch Q2 is grounded, the enable terminal is pulled low and the constant current source 2 no longer outputs current. In other words, when the output voltage of the constant current source 2 reaches the starting voltage of the LED luminaire, both the first switch Q1 and the second switch Q2 conduct, the enable terminal of the constant current source 2 is pulled low, and the constant current source 2 no longer outputs current.

It should be noted that the first switch Q1 and the second switch Q2 in FIG. 3 are exemplified by IGBTs, but only as an example and not as a limitation.

In a specific embodiment, as shown in FIG. 3, the second enabling switch circuit 112 further comprises: a third resistor R3; and the control terminal of the second switch Q2 is also grounded through the third resistor R3.

Specifically, a third resistor R3 is provided between the control terminal and the second terminal of the second switch Q2 to prevent overshooting of the voltage of the second switch Q2.

Figure 4:
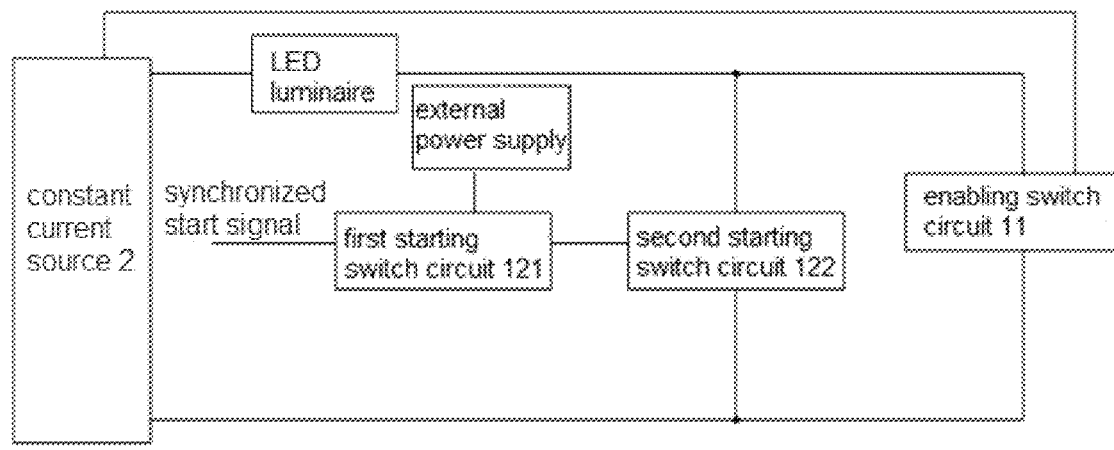
FIG. 4 shows a diagram of a specific example of a synchronous start-up circuit provided by an embodiment of the present invention.

In a specific embodiment, as shown in FIG. 4, the starting switch circuit 12 includes: a first starting switch circuit 121 and a second starting switch circuit 122.

As shown in FIG. 4, the control terminal of the first starting switch circuit 121 receives a synchronized start signal, a first terminal of the first starting switch circuit 121 is connected to an external power supply voltage, and a second terminal of the first starting switch circuit 121 is connected to the first terminal of the second starting switch circuit; the first starting switch circuit 121 may be a circuit comprising a switching function element.

As shown in FIG. 4, the second terminal of the second start switching circuit 122 is connected to the second terminal of the LED luminaire, and the third terminal of the second start switching circuit 122 is connected to the second terminal of the constant current source 2; the second start switching circuit 122 may be a circuit comprising a switching function element.

In order to ensure that each LED luminaire is started at the same time, it is therefore necessary to ensure that the output voltage of the constant current source 2 of each LED luminaire reaches the starting voltage value of each LED luminaire before the first starting switch circuit 121 receives the synchronized starting signal, and as can be seen from the foregoing, the function of the enabling switch circuit 11 is to ensure that the starting switch circuit 12 does not receive the synchronized starting signal before the constant current source 2 output voltage reaches the starting voltage of each LED luminaire. When the output voltage of the constant current source 2 reaches the starting voltage of the LED luminaire, the constant current source 2 is controlled to no longer output current to wait for the synchronized starting. Therefore, when the output voltage of the constant current source 2 does not reach the starting voltage of the LED luminaire, the first starting switch circuit 121 and the second starting switch circuit 122 are disconnected, and the LED luminaire will not be lit at this time. Once the output voltage of the constant current source 2 reaches the start voltage of the LED luminaire, and after a preset time, the first starting switch circuit 121 receives the synchronized start signal and conducts, the second starting switch circuit 122 conducts, the constant current source 2 discharges to supply power to the LED luminaire, and the LED luminaire lights up.

In a specific embodiment, as shown in FIG. 3, the first starting switch circuit 121 includes: a third switch Q3, a fourth switch Q4, a fourth resistor R4, and a fifth resistor R5, wherein the control terminal of the third switch Q3 receives a synchronized start signal through the fourth resistor R4 (the CTL terminal is connected to the controller in FIG. 3, and the controller sends the synchronized start signal to the third switch Q3 through the CTL end), the first terminal of the third switch Q3 is connected to the control terminal of the fourth switch Q4 through the fifth resistor R5, and the second terminal of the third switch Q3 is grounded; the first terminal of the fourth switch Q4 is connected to an external power supply voltage (VCC), and the second terminal of the fourth switch Q4 is connected to the first terminal of the second start switching circuit (the terminal of the sixth resistor R6).

It should be noted that the third switch Q3 and the fourth switch Q4 in FIG. 3 are exemplified as IGBTs, but only as an example and not as a limitation.

Specifically, taking the third switch Q3 and the fourth switch Q4 which are both IGBTs as an example, the synchronous start signal is necessarily a high level signal, and when the third switch Q3 does not receive the synchronous start signal, the control terminal of the third switch Q3 is pulled low, the third switch Q3 is disconnected, and because the fourth switch Q4 is an NPN-type IGBT, the fourth switch Q4 is disconnected, and the second terminal of the sixth resistor R6 outputs a low level to the second starting switch circuit; when the third switch Q3 receives the synchronized start signal, the third switch Q3 conducts, the control terminal of the fourth switch Q4 is pulled low, and since the fourth switch Q4 is an NPN-type IGBT, the fourth switch Q4 conducts, and the second terminal of the sixth resistor R6 outputs a high level to the second starting switch circuit 122.

In a specific embodiment, as shown in FIG. 3, the second start switching circuit 122 comprises: a fifth switch Q5, a sixth resistor R6, and a seventh resistor R7. The control terminal of the fifth switch Q5 is connected to the second terminal of the first start switching circuit 121 through the sixth resistor R6, and the control terminal of the the fifth switch Q5 is also connected to the second terminal of the constant current source 2 through the seventh resistor R7. The first terminal of the fifth switch Q5 is connected to the second terminal of the LED luminaire, and the second terminal of the fifth switch Q5 is connected to the second terminal of the constant current source 2.

It should be noted that the fifth switch Q5 in FIG. 3 is exemplified as a MOSFET, but only as an example and not as a limitation.

Specifically, when the first starting switch circuit 121 is disconnected, i.e., when the third switch Q3 and the fourth switch Q4 are both disconnected, the control terminal of the fifth switch Q5 inputs a low level, i.e., the voltage divided between the sixth resistor R6 and the seventh resistor R7 is less than the threshold voltage of the fifth switch Q5, and the fifth switch Q5 is still in the disconnected state, and the 2-pin of the interface CN1 is disconnected from the second terminal of the constant-current source 2, so that the LED luminaires cannot light up. When the first starting switch circuit 121 is on, i.e., when the third switch Q3 and the fourth switch Q4 are both on, the control terminal of the fifth switch Q5 inputs a high level, i.e., the voltage divided between the sixth resistor R6 and the seventh resistor R7 is greater than the threshold voltage of the fifth switch Q5, and the fifth switch Q5 conducts, and the 2-pin of the interface CN1 is connected to the second terminal of the constant-current source 2 to form a constant-current source 2 discharging circuit, and the LED luminaire lights up.

In a specific embodiment, as shown in FIG. 3, the second starting switch circuit 122 further comprises: a first diode D1, the cathode of which is connected to a first terminal of the sixth resistor R6, and the anode of which is connected to the second terminal of the constant current source 2.

Specifically, the first diode D1 is connected in parallel with the seventh resistor R7 to protect the second start switching circuit 122, which in fact protects the fifth switch Q5. In a specific embodiment, as shown in FIG. 3, the second start switching circuit 122 further comprises: a filtering capacitor C1, which is used to connect the control terminal of the fifth switch Q5 and the second terminal of the fifth switch Q5.

Specifically, the filter capacitor C1 is provided to eliminate the effect of the MOSFET turning on due to voltage variations, hence the presence of the gate drain capacitance Cgd and the gate source capacitance Cgs, where Cgd is more sensitive to voltage variations and needs to be connected in parallel to eliminate the effect. This capacitance can be omitted if a MOSFET with a small enough Cgd is selected.

Example 2

Figure 5:
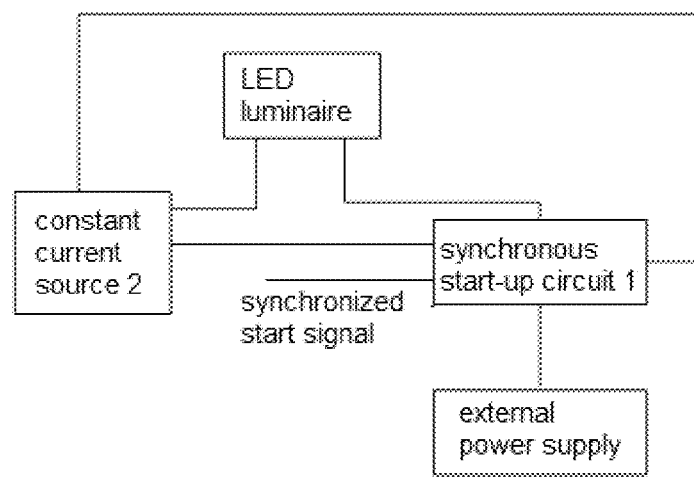
FIG. 5 shows a diagram of a specific example of a constant current deep dimmable power supply provided by an embodiment of the present invention.

An embodiment of the present invention provides a constant current deep dimmable power supply, as shown in FIG. 5, comprising: the synchronous start-up circuit 1 of example 1 and a constant current source 2.

As shown in FIG. 5, the first terminal of the constant current source 2 is connected to the first terminal of the LED luminaire, and the second terminal of the constant current source 2 is connected to the first terminal of the synchronous start-up circuit 1; the output voltage of the constant current source 2 does not immediately reach the start voltage of the LED luminaire, and its voltage rise time is determined by the characteristics of its internal components.

As shown in FIG. 5, the second terminal of the synchronous start-up circuit 1 is connected to the second terminal of the LED light luminaire, the third terminal of the synchronous start-up circuit 1 is connected to the control terminal of the constant current source 2, the fourth terminal of the synchronous start-up circuit 1 receives a synchronized start signal, and the fifth terminal of the synchronous start-up circuit 1 is connected to an external power supply voltage.

Specifically, when the output voltage of the constant current source 2 does not reach the starting voltage of the LED luminaire, the synchronous start-up circuit 1 is disconnected; when the output voltage of the constant current source 2 reaches the starting voltage of the LED luminaire, the synchronous start-up circuit 1 outputs a power-off signal, and the constant current source 2 no longer outputs a current; starting from the moment when the constant current source 2 starts outputting a voltage, after a preset period of time, the synchronous start-up circuit 1 receives a synchronous starting signal, the constant current source 2 discharges to supply power to the LED luminaire.

It should be noted that the constant current source 2 in example 2 is in fact the constant current source in example 1, and thus the two constant current sources have the same function and structure.

Specifically, the synchronous start-up circuit 1 implements two functions: 1. when the output voltage of the constant current source 2 reaches the start voltage of the LED luminaire, the constant current source 2 is controlled to stop outputting current; 2. when the synchronized start signal is received again, it creates a discharge circuit of the constant current source 2 to supply power to the LED luminaire. All of the above functions have been described in detail in Example 1 and will not be repeated here.

Figure 6:
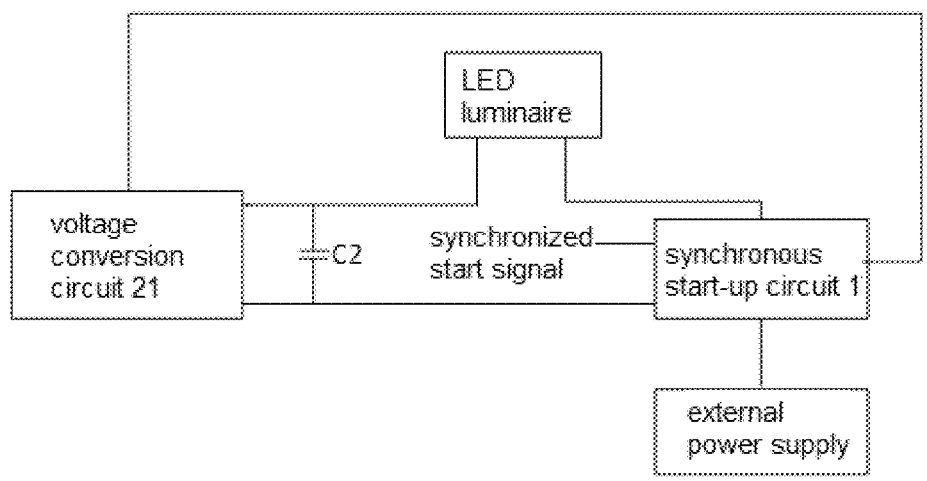
FIG. 6 shows a diagram of another specific example of a constant current deep dimmable power supply provided by an embodiment of the present invention.

In a specific embodiment, as shown in FIG. 6, the constant current source 2 includes: a voltage conversion circuit 21 and an electrolytic capacitor C2, wherein the first terminal of the voltage conversion circuit 21 is connected to the first terminal of the electrolytic capacitor C2 and the first terminal of the LED luminaire, the second terminal of the voltage conversion circuit 21 is connected to the second terminal of the electrolytic capacitor C2 and the first terminal of the synchronous start-up circuit 1, and the control terminal of the voltage conversion circuit 21 is connected to the third terminal of the synchronous start-up circuit 1; when the voltage conversion circuit 21 receives the charging signal, the voltage conversion circuit 21 charges the electrolytic capacitor C2;

Specifically, the voltage conversion circuit 21 can be a BUCK circuit, and when the voltage of the electrolytic capacitor C2 does not reach the start voltage of the LED luminaire, the synchronous start circuit 1 is disconnected; when the voltage of the electrolytic capacitor C2 reaches the start voltage of the LED luminaire, the synchronous start circuit 1 outputs a power-off signal, and the voltage conversion circuit 21 is no longer charging the electrolytic capacitor C2; After a preset time from the receipt of the charging signal by the voltage conversion circuit 21, the synchronous start circuit 1 receives a synchronous start signal, and the electrolytic capacitor C2 discharges to supply power to the LED luminaire.

The operating principle of the voltage conversion circuit 21 and the electrolytic capacitor C2 is in fact the same as that of the BUCK circuit and the electrolytic capacitor C2 of Example 1, and will not be repeated herein.

Figure 7:
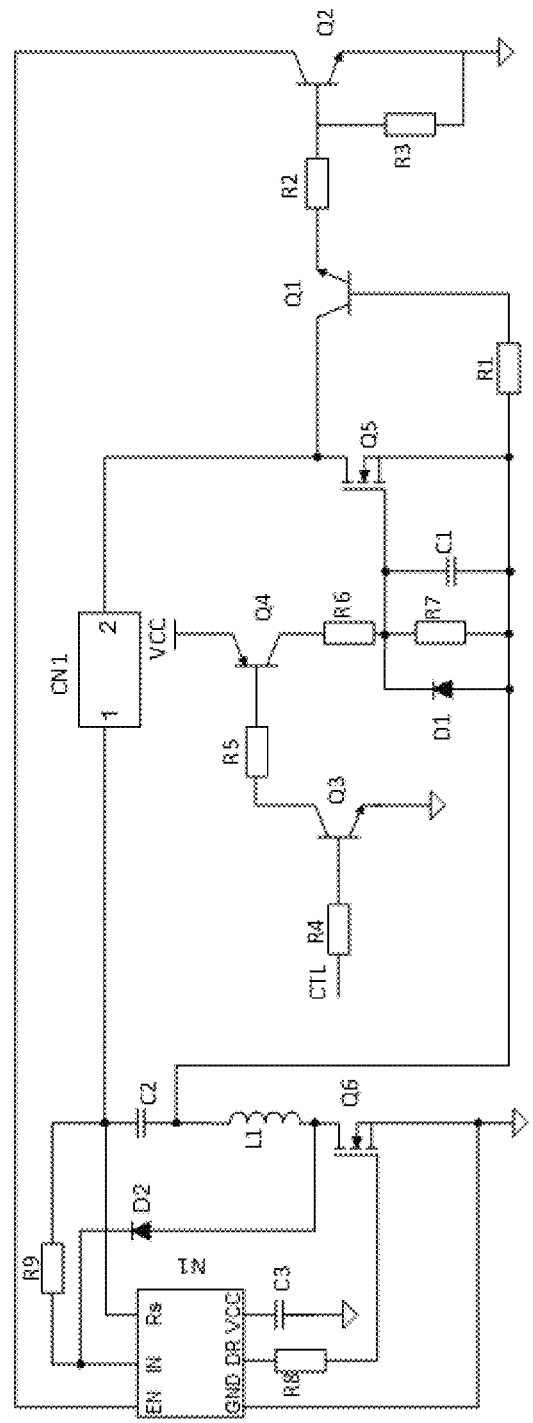
FIG. 7 shows a circuit diagram of a constant current deep dimmable power supply provided by an embodiment of the present invention.

Exemplarily, when the voltage conversion circuit 21 is a BUCK circuit, its topology is shown in FIG. 7. In FIG. 7, the DC-DC chip N1 and the eighth resistor R8, the second diode D2, the inductor L1, and the sixth switch Q6 form a BUCK circuit to realize outputting a constant current to charge the electrolytic capacitor C2.

The above embodiments are merely examples for the purpose of clear illustration, and are not a limitation of the embodiments. For those of ordinary skill in the art, other variations or changes in different forms may be made on the basis of the above description. It is neither necessary nor possible to exhaust all of the embodiments herein. The obvious variations or changes derived therefrom are still within the scope of protection of the present invention.

The invention claimed is:

1. A synchronous start-up circuit, characterized in that a front stage of the synchronous start-up circuit (1) is connected to a constant current source (2) for an LED luminaire, and a rear stage of the synchronous start-up circuit (1) is connected to the LED luminaire, and the synchronous start-up circuit (1) comprises an enabling switch circuit (11) and a starting switch circuit (12), wherein:
   a first terminal of the constant current source (2) is connected to a first terminal of the LED luminaire;
   a control terminal of the enabling switch circuit (11) is connected to a second terminal of the constant current source (2), and a first terminal of the enabling switch circuit (11) is connected to a second terminal of the LED luminaire, and a second terminal of the enabling switch circuit (11) is connected to the control terminal of the constant current source (2);
   wherein a control terminal of the starting switch circuit (12) receives a synchronized start signal, a first terminal of the starting switch circuit (12) is connected to an external supply voltage, a second terminal of the starting switch circuit (12) is connected to the second terminal of the constant current source (2), and a third terminal of the starting switch circuit is connected to the second terminal of the LED luminaire; the synchronized start signal is used to control the synchronous start-up circuit (1) of the LED luminaire through controlling the starting switch circuit (12) of the synchronous start circuit (1) of the LED luminaire for the constant current source (2) to discharge simultaneously;

when an output voltage of the constant current source (2) does not reach a starting voltage of the LED luminaire, both the enabling switch circuit (11) and the starting switch circuit (12) are disconnected;

when the output voltage of the constant current source (2) reaches the starting voltage of the LED luminaire, the enabling switch circuit (11) conducts and outputs a power-off signal, wherein the power-off signal is used to control the constant current source (2) to no longer output current;

the starting switch circuit (12) receives the synchronized start signal at a preset time after the constant current source (2) starts to output the output voltage, the starting switch circuit (12) then starts conducting, and the constant current source (2) discharges to supply power to the LED luminaire.

2. The synchronous start-up circuit according to claim 1, characterized in that the enabling switch circuit (11) comprises a first enabling switch circuit (111) and a second enabling switch circuit (112), wherein:

a control terminal of the first enabling switching circuit (111), which is for the control terminal of the enabling switch circuit (11), is connected to the second terminal of the constant current source (2), a first terminal of the first enabling switching circuit (111), which is for the first terminal of the enabling switch circuit (11), is connected to the second terminal of the LED luminaire, and a second terminal of the first enabling switching circuit (111) is connected to a control terminal of the second enabling switching circuit (112);

a first terminal of the second enabling switching circuit (112), which is for the second terminal of the enabling switch circuit (11), is connected to the control terminal of the constant current source (2) and a second terminal of the second enabling switch circuit is grounded;

when the output voltage of the constant current source (2) does not reach the starting voltage of the LED luminaire, both the first enabling switch circuit (111) and second enabling switch circuit (112) are disconnected;

when the output voltage of the constant current source (2) reaches the starting voltage of the LED luminaire, both the first enabling switch circuit (111) and the second enabling switch circuit (112) conduct, and the first terminal of the second enabling switch circuit (112) outputs the power-off signal.

3. The synchronous start-up circuit according to claim 2, characterized in that the first enabling switch circuit (111) comprises: a first resistor (R1) and a first switch (Q1), wherein:

a control terminal of the first switch (Q1) is connected to the second terminal of the constant current source (2) via the first resistor (R1), a first terminal of the first switch (Q1) is connected to the second terminal of the LED luminaire, and a second terminal of the first switch (Q1) is connected to the control terminal of the second enabling switch circuit (112).

4. The synchronous start-up circuit according to claim 2, characterized in that the second enabling switch circuit (112) comprises: a second resistor (R2) and a second switch (Q2), wherein:

a control terminal of the second switch (Q2) is connected to the second terminal of the first enabling switching circuit (111) through the second resistor (R2), a first terminal of the second switch (Q2) is connected to the control terminal of the constant current source (2) and a second terminal of the second switch (Q2) is grounded.

5. The synchronous start-up circuit according to claim 4, characterized in that the second enabling switch circuit (112) further comprises:

a third resistor (R3);

and the control terminal of the second switch (Q2) is further grounded through the third resistor (R3).

6. The synchronous start-up circuit according to claim 1, characterized in that the starting switch circuit (12) comprises a first starting switch circuit (121) and a second starting switch circuit (122), wherein:

a control terminal of the first start switching circuit (121), which is for the control terminal of the starting switch circuit (12), receives the synchronized start signal, a first terminal of the first start switching circuit (121), which is for the first terminal of the starting switch circuit (12), is connected to the external supply voltage, and a second terminal of the first start switching circuit (121) is connected to a first terminal of the second start switching circuit (122);

a second terminal of the second start switching circuit (122), which is for the third terminal of the starting switch circuit (12), is connected to the second terminal of the LED luminaire and a third terminal of the second start switching circuit (122), which is for the second terminal of the starting switch circuit (12), is connected to the second terminal of the constant current source (2);

when the output voltage of the constant current source (2) does not reach the starting voltage of the LED luminaire, the first starting switching circuit (121) and second starting switching circuit (122) are disconnected;

when the output voltage of the constant current source (2) reaches the starting voltage of the LED luminaire, after the preset time, the first starting switch circuit (121) receives the synchronized start signal and conducts, the second starting switch circuit (122) conducts and the constant current source (2) discharges to supply power to the LED luminaire.

7. The synchronous start-up circuit according to claim 6, characterized in that the first starting switch circuit (121) comprises: a third switch (Q3), a fourth switch (Q4), a fourth resistor (R4), and a fifth resistor (R5), wherein:

a control terminal of the third switch (Q3) receives the synchronized start signal through the fourth resistor (R4), a first terminal of the third switch (Q3) is connected to a control terminal of the fourth switch (Q4) through the fifth resistor (R5), and a second terminal of the third switch (Q3) is grounded;

a first terminal of the fourth switch (Q4) is connected to the external supply voltage, and a second terminal of the fourth switch (Q4) is connected to the first terminal of the second starting switch circuit (122).

8. The synchronous start-up circuit according to claim 6, characterized in that the second starting switch circuit (122) comprises: a fifth switch (Q5), a sixth resistor (R6) and a seventh resistor (R7), wherein:

a control terminal of the fifth switch (Q5) is connected to the second terminal of the first start switching circuit (121) through the sixth resistor (R6), the control terminal of the fifth switch (Q5) is also connected to the second terminal of the constant current source (2) through the seventh resistor (R7), a first terminal of the fifth switch (Q5) is connected to the second terminal of the LED luminaire and a second terminal of the fifth switch (Q5) is connected to the second terminal of the constant current source (2).

9. The synchronous start-up circuit according to claim 8, characterized in that the second starting switch circuit (122) further comprises a first diode (D1), wherein:
   a cathode of the first diode (D1) is connected to a first terminal of the sixth resistor (R6), and an anode of the first diode (D1) is connected to the second terminal of the constant current source (2).

10. The synchronous start-up circuit according to claim 9, characterized in that the second starting switch circuit (122) further comprises:
   a filter capacitor (C1) connecting the control terminal of the fifth switch (Q5) and the second terminal of the fifth switch (Q5).

11. A constant current deep dimmable power supply, comprising: the synchronous start-up circuit (1) as claimed in claim 1, and the constant current source (2), wherein:
   the first terminal of the constant current source (2) is connected to the first terminal of the LED luminaire, and the second terminal of the constant current source (2) is connected to a first terminal of the synchronous start-up circuit (1);
   a second terminal of the synchronous start-up circuit (1) is connected to the second terminal of the LED luminaire, a third terminal of the synchronous start-up circuit (1) is connected to the control terminal of the constant current source (2), a fourth terminal of the synchronous start-up circuit (1) inputs a synchronized start signal, and a fifth terminal of the synchronous start-up circuit (1) is connected to an external supply voltage;
   when the output voltage of the constant current source (2) does not reach the starting voltage of the LED luminaire, the synchronous start-up circuit (1) is disconnected;
   when the output voltage of the constant current source (2) reaches the starting voltage of the LED luminaire, the synchronous start-up circuit (1) outputs the power-off signal and the constant current source (2) no longer outputs current;
   the synchronous start-up circuit (1) receives the synchronized start signal at a preset time after the constant current source (2) starts to output the output voltage and the constant current source (2) discharges to supply power to the LED luminaire.

12. The constant current deep dimmable power supply according to claim 11, characterized in that the constant current source (2) comprises: a voltage conversion circuit (21) and an electrolytic capacitor (C2), wherein:
   a first terminal of the voltage conversion circuit (21) is connected to a first terminal of the electrolytic capacitor (C2) and the first terminal of the LED luminaire, a second terminal of the voltage conversion circuit (21) is connected to a second terminal of the electrolytic capacitor (C2) and the first terminal of the synchronous start-up circuit (1), and a control terminal of the voltage conversion circuit (21) is connected to the third terminal of the synchronous start-up circuit (1);
   when the voltage conversion circuit (21) receives a charging signal, the voltage conversion circuit (21) charges the electrolytic capacitor (C2);
   when the voltage of the electrolytic capacitor (C2) does not reach the starting voltage of the LED luminaire, the synchronous start-up circuit (1) is disconnected;
   when the voltage of the electrolytic capacitor (C2) reaches the starting voltage of the LED luminaire, the synchronous start-up circuit (1) outputs the power-off signal and the voltage conversion circuit (21) no longer charges the electrolytic capacitor (C2);
   the synchronous start-up circuit (1) receives the synchronized start signal at a preset time after the voltage conversion circuit (21) receives the charging signal and the electrolytic capacitor (C2) discharges to supply power to the LED luminaire.

* * * * *